(12) United States Patent
Davis

(10) Patent No.: US 7,069,584 B1
(45) Date of Patent: Jun. 27, 2006

(54) PROCESS AND APPARATUS FOR IMPROVING THE SECURITY OF AUTHENTICATION PROCEDURES USING A NEW "SUPER PIN"

(75) Inventor: Steven Benjamin Davis, Washington, DC (US)

(73) Assignee: Davis Campbell Engineering LLC, Washington, DC (US)

( * ) Notice: Subject to any disclaimer, the term of this patent is extended or adjusted under 35 U.S.C. 154(b) by 0 days.

(21) Appl. No.: 09/456,288

(22) Filed: Dec. 8, 1999

Related U.S. Application Data

(60) Provisional application No. 60/111,379, filed on Dec. 8, 1998.

(51) Int. Cl.
*G06F 7/04* (2006.01)
*H04L 9/00* (2006.01)

(52) U.S. Cl. .............................. 726/5; 380/268; 705/72

(58) Field of Classification Search ................ 713/201, 713/186, 166, 184, 183, 159; 380/46; 705/72; 709/203, 220, 230, 238, 249; 382/100, 115, 382/125
See application file for complete search history.

(56) References Cited

U.S. PATENT DOCUMENTS

| | | | | | |
|---|---|---|---|---|---|
| 5,724,423 | A | * | 3/1998 | Khello | 713/184 |
| 5,737,422 | A | * | 4/1998 | Billings | 713/159 |
| 5,940,511 | A | * | 8/1999 | Wilfong | 713/183 |
| 6,185,316 | B1 | * | 2/2001 | Buffam | 382/115 |
| 6,363,152 | B1 | * | 3/2002 | Cornelius et al. | 380/255 |
| 6,618,366 | B1 | * | 9/2003 | Furukawa et al. | 370/338 |

* cited by examiner

*Primary Examiner*—Christopher Revak
*Assistant Examiner*—Brandon Hoffman
(74) *Attorney, Agent, or Firm*—Katten Muchin Rosenman LLP

(57) ABSTRACT

Method and apparatus for a provider to verify a client's secret identifier includes structure and steps for the client to scramble his/her predetermined secret identifier in a random way with random data. The scrambled data is transmitted to the provider, and the provider determines whether the client's secret identifier is present in the received scrambled data. Preferably, the provider rejects a transaction if the random data in the received scrambled data is substantially the same as random data received in a previous transaction corresponding to said client.

54 Claims, 3 Drawing Sheets

Sample Super PIN Chit

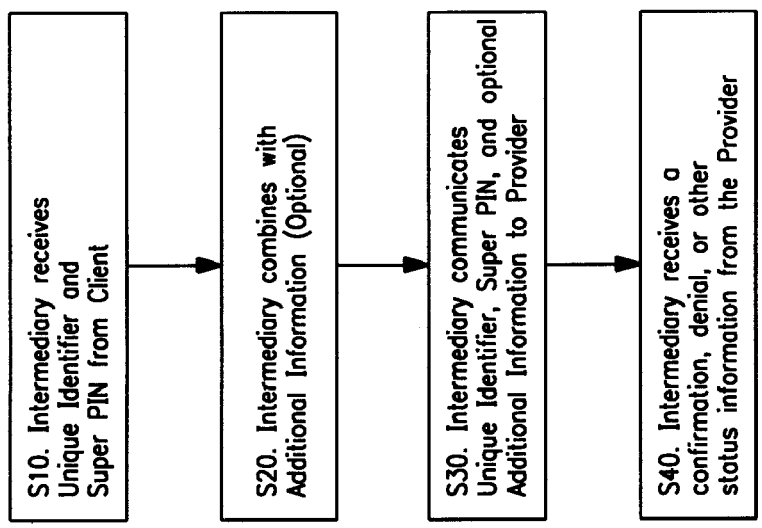

PROCESS AND APPARATUS FOR IMPROVING THE SECURITY OF AUTHENTICATION PROCEDURES USING A NEW "SUPER PIN"

This application claims the benefit of Provisional Application No. 60/111,379, filed Dec. 8, 1998.

BACKGROUND OF THE INVENTION

1. Field of the Invention

The present invention relates to apparatus and method for improving the security of authentication procedures using a new "Super PIN", particularly for protecting credit card and other purchase transactions.

2. Related Art

Authentication of users and systems began with the signature or seal. These methods are not very secure and principally rely on legal protections such as laws against forgery to ensure their effectiveness. The signature or seal has been mostly replaced by the use of secret passwords and Personal Identification Numbers (PINs) to authenticate users of systems and has been common practice for a number of years. These authentication systems have proven themselves and are widely used to authenticate people for systems ranging from computers to credit cards and telephone cards. It is also used for automated authentication of systems such as cellular telephones. The security of these systems is limited by the vulnerability of the system to the compromise of the password or PIN. But, it has an advantage over an ordinary signature in that it can be automatically processed. The standard solution to this problem has been to move to a much more complicated system relying on smart cards to provide encryption or challenge/response security for authentication. This solution, while very effective, is also quite expensive to deploy on a large scale. Individual cards must be issued and an infrastructure to process them.

Transaction security systems usually consist of a Unique Identifier that is used as a reference for the individual involved in a transaction (such as a credit card account number). This identifier is used to indicate the individual involved in the transaction. The most commonly used security solution is to augment the identifier is a Personal Identification Number (PIN). This Secret Identifier is entered into ATM machines or phones for transactions. The problem with this solution for many transactions is that the Secret Identifier may be disclosed—"shoulder surfing" is a major problem for phone cards. Without the use of a Secret Identifier, a Unique Identifier is not sufficient because it is widely distributed.

The next level of solution that has been proposed is to use a smart card to store or process Secret Identifier information so that it is only available to the issuer of the card or the card itself. The problem with this approach is that, while it is very secure, it is also expensive. Additional processing capability is required at the location of each transaction and someone must pay for the smart card, itself.

SUMMARY OF THE INVENTION

The "Super PIN" solution is a compromise that targets the most common forms of fraud—casual, low-tech criminals who steal individual cards at the time of a single transaction. This scenario matches theft by waiters, sales clerks, "shoulder surfing", "dumpster divers", and other individuals that have incidental access to credit card numbers and PINs. This solution augments the Secret Identifier or PIN with a scheme that effectively obscures the PIN while being implementable without additional technology for the consumer, the point of sale system, or at the credit card server.

The "Super PIN" attempts to deal with the most common forms of fraud—the casual observance or theft of PINs or passwords. This solution is not as strong as a smart card encryption or challenge/response system, but it is radically cheaper. It builds on the traditional processing infrastructure with minimal increase in complexity and may even reduce processing requirements. On the customer side, the traditional PIN or password is augmented by a procedural change that should be easy for ordinary people to implement.

This solution works simply by "scrambling" the Secret Identifier with consumer generated random data to obscure the identifier. This scrambled identifier is included with the Unique Identifier to authenticate the transaction. The consumer will scramble his Secret Identifier with a new set of random data for each transaction. The credit card server can validate the Secret Identifier information by comparing it with its own stored copy of the information. The credit card server will reject multiple transactions that use the same scrambled identifier. The credit card server will also be suspicious of transactions that have "similar" scrambled identifiers to previously used ones. This has several benefits—the adversary cannot use the data that was given in identical format or similar format or he will have the transaction rejected and provide a good indicator of where the fraud occurred. An adversary will need to see multiple transactions from the same account to be able to beat the system. This significantly increases the difficulty of casual fraud with only minimal cost impact to implement.

In accordance with a first aspect of the present invention, a method for a provider to verify a client's secret identifier, comprises the steps of: (i) the client scrambles his/her predetermined secret identifier in a random way with random data; (ii) the scrambled data is transmitted to the provider; and (iii) the provider determines whether the client's secret identifier is present in the received scrambled data. Preferably, the provider rejects the transaction if the random data in the received scrambled data is substantially the same as random data received in a previous transaction corresponding to said client.

In accordance with another aspect of the present invention, a method for a provider to verify a client's secret identifier received in scrambled data which includes the secret identifier scrambled with random data, comprises the steps of: (i) determining whether the client's secret identifier is present in the received scrambled data; (ii) comparing the random data in the received scrambled data with previously received random data corresponding to said client; and (iii) authorizing a transaction if the random data in the received scrambled data is substantially different from said previously received random data.

BRIEF DESCRIPTION OF THE DRAWINGS

FIG. 3 shows the process that is followed by an intermediary, such as a merchant, for processing a Super PIN protected transaction.

DETAILED DESCRIPTION OF THE PREFERRED EMBODIMENTS

Introduction

There are three major processes involved in the "Super PIN" client usage, provider verification, and provider issuance. Client usage is the process that the Client uses to create the "Super PIN". Provider verification is the process used to verify the "Super PIN" including the special case where there is an intermediary (such as a merchant) and Provider Issuance is the process used to issue new or altered "Super PINs". The following are relevant terms:

- Unique Identifier—an account number, user ID, or other name used to uniquely track and identify people, equipment, or other items of interest;
- Secret Identifier—a secret set or sequence of symbols, such as a series of numbers or alphanumeric characters, associated with a given Unique Identifier. Passwords and PINs are examples of Secret Identifiers. Secret Identifiers may be periodically changed;
- Random Data—a set or sequence of symbols selected by some random or pseudo-random process;
- Super PIN—a combination of a given Secret Identifier and Random Data that are, in turn, put into a random sequence;
- Transaction—an activity that needs identification and authentication such as a session or purchase;
- Client—an individual person or system that participates in a transaction. A unique identifier is associated with each client; and
- Provider—an entity that authorizes a transaction such as a credit card firm, telephone company, or computer.

The example described in detail below is for a credit card processing scenario. Other scenarios would follow a similar general procedure.

THE PREFERRED EMBODIMENT

Client Usage

Figure 1:
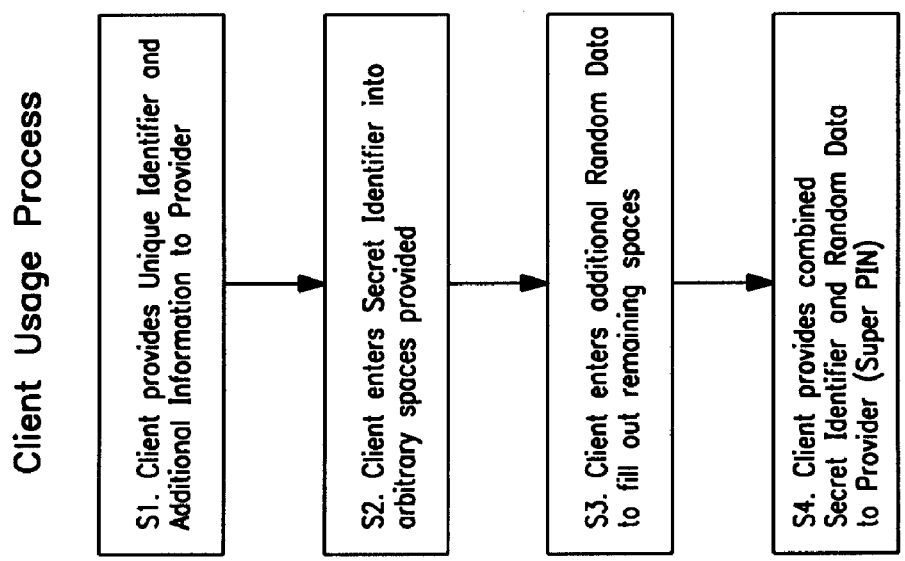
FIG. 1 shows the client usage process, how a consumer or other user would participate in the Super PIN process.

Prior to the beginning of any transaction, the Client will be provided with a Unique Identifier, a Secret Identifier, and the process for generating the Super PIN. For a credit card scenario, the Unique Identifier is the credit card number and the Secret Identifier is the PIN. The process for generating the Super PIN is described as follows (see FIG. 1):

S1. Once the Client has decided to begin a transaction (in this case a credit card purchase), the Unique Identifier and purchase price information are recorded by the merchant on a chit. In traditional credit card processing, the Client would sign the chit. For the Super PIN process, the Client will also insert the Super PIN as described below. The chit will include spaces for the Super PIN.

S2. The Client will write in the symbols from his Unique Identifier into some of the spaces in arbitrary order and in arbitrary spaces.

S3. The Client will fill in the remaining spaces with Random Data—symbols created at random by the Client.

Figure 2:
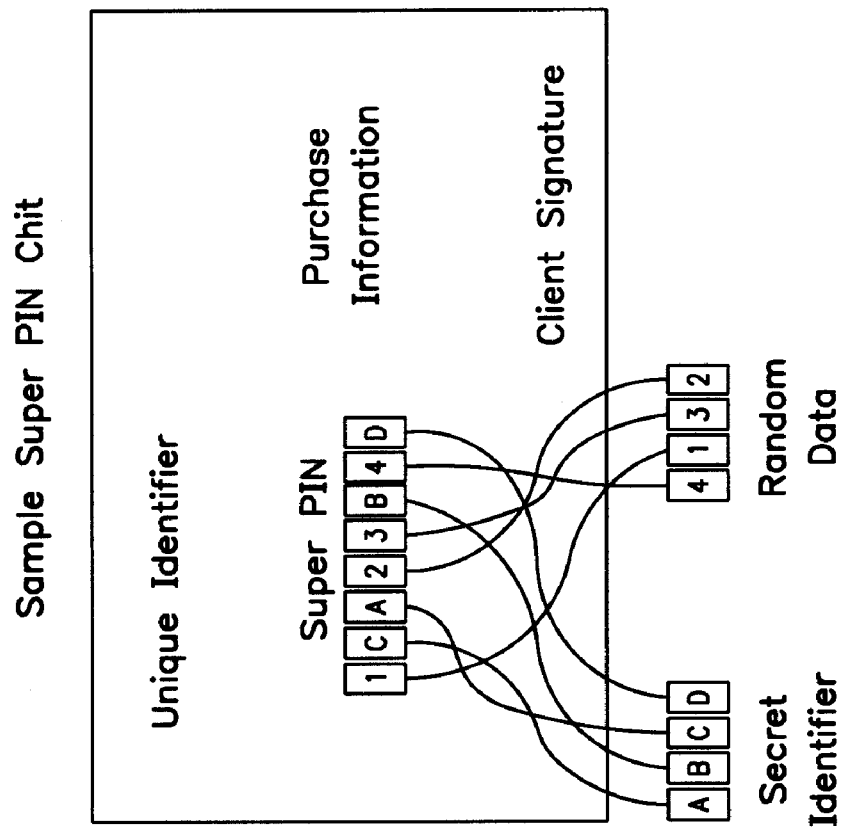
FIG. 2 shows a sample service "chit" to demonstrate how a client/consumer could easily implement this procedure using existing processes.

S4. The resulting scrambled Unique Identifier and Random Data are provided to the merchant (see FIG. 2 for sample manual chit). The purchase is then either approved or denied by the Provider (see below).

Provider Verification

Providers authenticate clients by means of the Super PIN. Often, however, there is an intermediary (see FIG. 3) in the verification process who communicates the information between the Client and the Provider, often for his own purposes, such as a merchant validating a credit card purchase.

Intermediary

The intermediary, if present, carries out the following processes (See FIG. 3):

S10. The intermediary receives the Unique Identifier and Super PIN from the Client.

S20. Optionally, the intermediary combines this information with any additional information, such as amount purchased for a credit card transaction.

S30. The intermediary communicates the Unique Identifier, Super PIN, and, optionally, other information, to the Provider.

S40. The intermediary receives a confirmation, denial, or other status information from the Provider.

Verification

Figure 4:
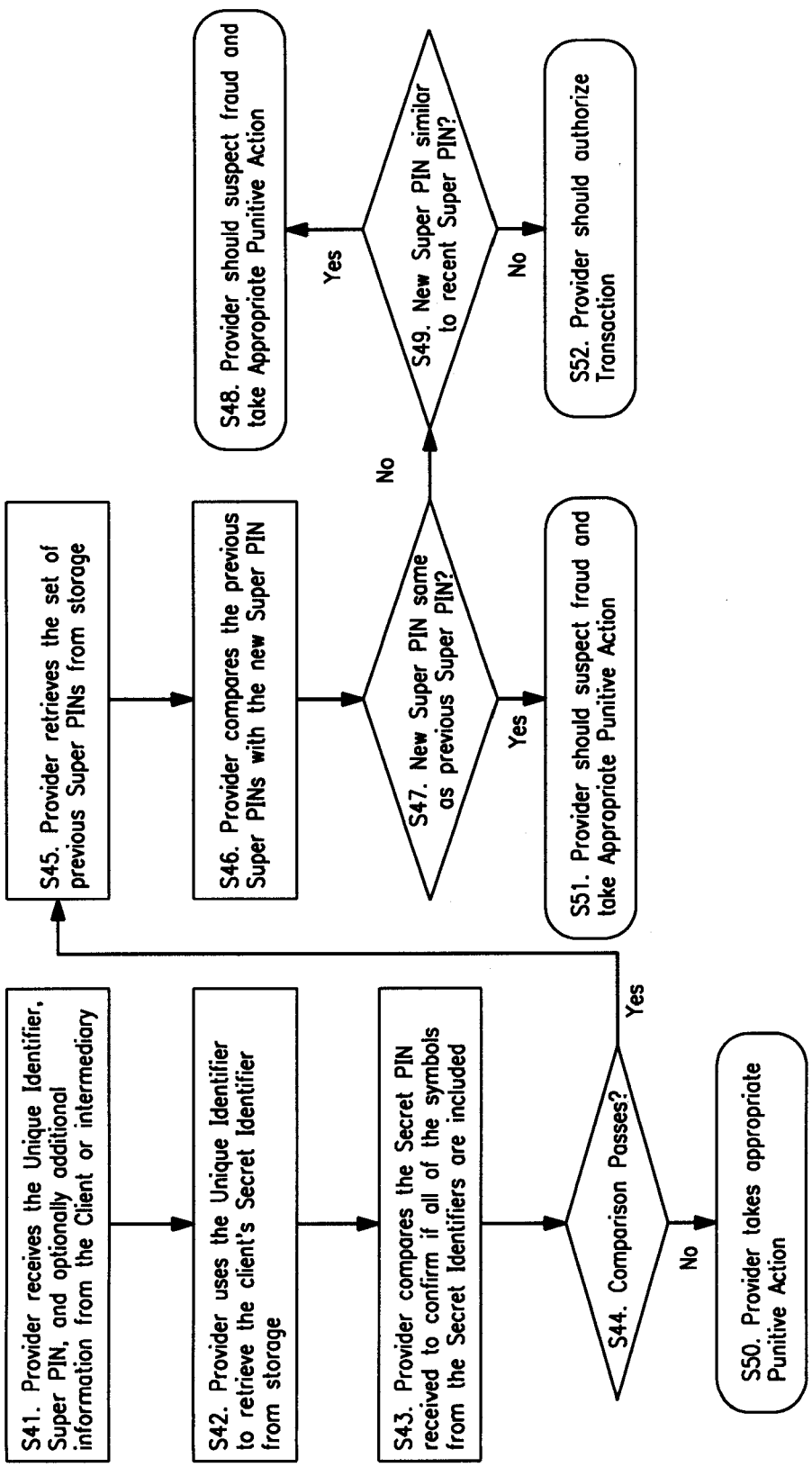
FIG. 4 shows the process that is followed by a provider, such as a credit card company, for validating a client/consumer's Super PIN.

Before any transaction, the Provider stores the Unique Identifier information and Secret Identifier for each Client (see Provider Issuance, below). The Provider may also store one or more of the previous Super PINs provided by the Client. The transaction processing by the Provider goes as follows (see FIG. 4):

S41. The Provider receives the Unique Identifier information, Super PIN, and optionally additional information from the Client or intermediary.

S42. The Provider uses the Unique Identifier information to retrieve the Client's Secret Identifier from storage.

S43. The Provider reviews the Secret PIN received from the Client, symbol by symbol, to confirm if all of the symbols from the Secret Identifier are included.

S44 and S50. If they are not included, then the Provider takes appropriate action, likely including rejecting the continued processing of the transaction.

S45. If all of the symbols from the Client's Secret Identifier are included, the Provider may retrieve the set of previous Super PINs from storage.

S46. The Provider will then compare the previous Super PINs with the new Super PIN.

S47 and S51. If the new Super PIN is the same as a recent Super PIN, the Provider may have a good reason to reject the transaction or carry out further authentication. For credit card purchases, this could include running heuristic models of purchases or requesting photographic or other ID to be provided by the supposed Client.

S49 and S48. If the new Super PIN is very similar to a recent Super PIN (depending on whatever filter or analysis tool the Provider wishes to use), the Provider may also have good reason to reject the transaction or carry out further authentication.

S52. If the new Super PIN is not the same or very similar to recent Super PINs, the Provider will likely authorize the transaction.

Provider Issuance

The Provider uses some independent communications means to provide the Client with the Client's Unique Identifier and Secret Identifier. These may be provided separately as credit cards are often mailed separately from PINs. It is possible for the Provider to send the Client some unique process used to create the Super PIN as opposed to the standard Super PIN process described above.

Adversary Challenge

The difficulty an adversary faces is different from that he faces today. Today, if the adversary sees a Client's Secret Identifier, he can easily pretend to be the Client and carry out transactions until he is caught based upon some heuristic or other security system. In the Super PIN system, he sees the Secret Identifier, but cannot separate it from the Random Data. If he reuses the same Super PIN or set of symbols from the Super PIN, he will be caught since the Provider stores previously used Super PINs. If he changes any of the symbols in the Super PIN that he uses, he is as likely to guess what one of the symbols from the Secret Identifier is as he is to guess one that is from the Random Data. It is likely, but not required that the Secret Identifier and the Random Data both contain the same number of symbols. If the proposed Super PIN is very close to a previous Super PIN, it is also quite likely to be rejected or include invalid guesses as to which symbols were from the Secret Identifier. The more "different" the Super PIN that the adversary uses, the more likely that it will be rejected for not including the Secret Identifier, but the more "similar" the Super PIN that the adversary used, the more likely that it will be rejected as a "re-use" or near re-use of a previous Super PIN. Clients are likely to pick very different Random Data—probably with worse correlation than at random, so it should be easy to build strong filters to separate Clients from adversaries.

The security of this system is focused on the low-tech or casual adversary. Once an adversary sees multiple Super PINs from the same Client, the Super PIN system becomes very easy to defeat very quickly. Such an adversary would need to monitor and analyze data from potential victims to be successful—but such adversaries often have other means of defeating security systems.

The following are some potential applications for the Super PIN system:

Internet Transactions—the speed and cost of processing for the Super PIN is significantly lower than for cryptographic and other security systems. The system can also be augmented by having the client's local computer generate the Random Data and scramble the Secret Identifier and Random Data (this can be done by the person manually, as well).

Computer and Network Logins—the user can enter his Super PIN into the keyboard or keypad.

Building Security—replacing PIN codes for door, garage, room, or other entry systems.

Telephone Cards—the user can state or type his Super PIN into the phone.

Credit Card and ATM Systems—this can even be used with manual "chits" where the user can write the Super PIN above his signature and it can be processed by traditional credit card systems with minimal change. This system should run much faster than the heuristics that are used to profile card users and so could be an effective "first filter" in the transaction authorization process.

Cellular Phones—today have a "secret ID" that is sent to the base station. This can and has been collected via monitoring of electronic signals. The Super PIN could be used and would force the adversary to collect the same phone on multiple calls—significantly more complicated than today, yet much faster for the legitimate system to process.

It is also possible to use alternate "rules" for the creation of the Super PIN.

There are better and worse choices for symbol sets (numeric, alphanumeric, ASCII characters, UNICODE characters, etc.), number of symbols in the Secret Identifier, and size of Secret Identifier vs. Random Data to give a significant range of security characteristics for a Super PIN system designer.

The individual components shown in outline or designated by blocks in the Drawings are all well-known in the security authentication arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalents arrangements included within the spirit and scope of the appended clients. The scope of the following claims is to be accorded the broadest interpretation so as to encompass all such modifications and equivalent structures and functions.

What is claimed is:

1. A method for a provider to verify a client's secret identifier, comprising the steps of:

the client scrambles his/her predetermined secret identifier in a one-time, true random way with random data, to produce scrambled data comprising randomly interleaved (i) said secret identifier and (ii) said one-time, true random data;

the scrambled data is transmitted to the provider; and the provider determines whether the client's secret identifier is present in the received scrambled data, wherein the provider rejects a transaction if the random data in the received scrambled data is substantially the same as random data received in a previous transaction corresponding to said client.

2. A method according to claim 1, wherein at least one of the secret identifier and the random data comprises a sequence of alphanumeric symbols.

3. A method for a provider to verify a client's secret identifier received in scrambled data which includes the secret identifier randomly interleaved with one-time, true random data, comprising the steps of:

determining whether the client's secret identifier is present in the received scrambled data, which includes the secret identifier randomly interleaved with the one-time, true random data;

comparing the one-time, true random data in the received scrambled data with previously received random data corresponding to said client; and authorizing a transaction if the one-time, true random data in the received scrambled data is substantially different from said previously received random data.

4. Apparatus for a provider to verify a client's secret identifier, comprising:

means for the client to scramble his/her predetermined secret identifier in a one-time, true random way with one-time, true random data, the scrambled data consisting of randomly interleaved (i) random data and (ii) the secret identifier;

a transmitter which transmits the scrambled data to the provider; and a provider processor which is used to determine whether the client's secret identifier is present in the received scrambled data, wherein the provider processor rejects a transaction if the random data in the received scrambled data is substantially the same as random data received in a previous transaction corresponding to said client.

5. Apparatus according to claim 4, wherein at least one of the secret identifier and the random data comprises a sequence of alphanumeric symbols.

6. A process for a consumer to submit secure verification information, comprising the steps of:

obtaining a secret identifier from a provider, said secret identifier being unique to said consumer;

randomly interleaving, in a one-time truly random way, the consumer's secret identifier with a plurality of randomly selected alphanumeric characters; and submitting the combined randomly interleaved secret identifier and plurality of randomly selected alphanumeric characters to the provider over a computer network.

7. A process according to claim 6, wherein said submitting step is performed on the Internet.

8. A process according to claim 6, wherein said randomly interleaving step and said submitting step are performed on a building security system.

9. A process according to claim 6, wherein said submitting step is performed over a telephone system.

10. A process according to claim 6, wherein said randomly interleaving step and said submitting step are performed in a credit or debit card verification system.

11. A process according to claim 6, wherein said randomly interleaving step and said submitting step are performed in an ATM system.

12. A process according to claim 6, wherein said randomly interleaving step and said submitting step are performed in an phone card system.

13. A process according to claim 6, wherein the consumer manually performs said randomly interleaving step.

14. A process according to claim 6, further comprising the step of the provider rejecting the submitted randomly interleaved identifier if the randomly interleaved identifier is substantially identical to a randomly interleaved identifier previously submitted to the provider.

15. A process according to claim 6, wherein the randomly interleaving step includes the step of changing an order of alphanumeric characters in the secret identifier.

16. A method of transacting a charge card purchase, comprising the steps of:

providing a user with a transaction form;

receiving from the user a credit card number and a super identifier, the super identifier comprising (i) a secret identifier unique to the user and (ii) a plurality of randomly chosen alphanumeric characters, selected in a one-time true random way, the super identifier comprising the randomly chosen alphanumeric characters randomly interleaved, in a one-time true random way, with the secret identifier;

comparing the received super identifier with a plurality of previously received super identifiers; and accepting the credit card transaction if the received super identifier is not substantially identical to previously received super identifiers.

17. A method according to claim 16, wherein the charge card purchase comprises a credit card purchase.

18. A method according to claim 16, wherein the charge card purchase comprises a debit card purchase.

19. A method according to claim 16, wherein the charge card purchase comprises a phone card purchase.

20. A method according to claim 16, wherein the charge card purchase comprises a lottery ticket purchase.

21. A method according to claim 16, wherein the secret identifier comprises a PIN.

22. A method according to claim 16, wherein the randomly chosen alphanumeric characters are chosen by the user.

23. A method according to claim 16, wherein the number of randomly chosen alphanumeric characters are the same as the number of characters in the secret identifier.

24. A method according to claim 16, wherein the method is performed at a point of sale.

25. A method according to claim 16, wherein the method is performed at a provider server.

26. A method according to claim 16, wherein the method is performed over the Internet.

27. A method according to claim 16, wherein the secret identifier is scrambled by the user using the plurality of alphanumeric characters.

28. A method according to claim 27, wherein at least one of the secret identifier and the random data comprises a sequence of alphanumeric symbols.

29. A method of carrying out a secure financial transaction, comprising the steps of:

receiving from a user (i) a request for a transaction and (ii) a super PIN which comprises a PIN randomly interleaved, in a one-time true random way, with a plurality of alphanumeric characters randomly chosen, in a one-time true random way, by a user; and accepting the request if the received super PIN is substantially different from a previously received super PIN.

30. A method according to claim 29, wherein the acceptance criteria is dependent on the Super PIN including all of the alphanumeric characters that comprise the user's secret identifier.

31. A method according to claim 29, wherein the acceptance criteria is dependent on the Super PIN not including substantially all of the plurality of randomly selected alphanumeric characters from a previous transaction.

32. A method according to claim 29, where the previously used plurality of randomly selected alphanumeric characters are stored.

33. A method according to claim 29, where a the rejection of the Super PIN validation triggers a supplementary validation activity.

34. Apparatus for a consumer to submit secure verification information including a secret identifier obtained from a provider, said a secret identifier being unique to said consumer, said apparatus comprising:

means for randomly interleaving, in a one-time true random way, the consumer's secret identifier with a plurality of alphanumeric characters; and means for submitting the randomly interleaved identifier to the provider, said means for submitting being coupled to a computer network.

35. Apparatus according to claim 34, wherein said means for submitting are coupled to the Internet.

36. Apparatus according to claim 34, wherein said means for submitting are coupled to a building security system.

37. Apparatus according to claim 34, wherein said means for submitting are coupled to a telephone system.

38. Apparatus according to claim 34, wherein said means for submitting are coupled to a credit card verification system.

39. Apparatus according to claim 34, wherein said means for submitting are coupled to an ATM system.

40. Apparatus according to claim 34, wherein the consumer uses a writing instrument to manually perform the random interleaving.

41. Apparatus according to claim 34, wherein an automated process or device performs the random interleaving.

42. Apparatus according to claim 34, wherein an automated process or device creates the Super PIN on behalf of the user.

43. Apparatus according to claim 34, further comprising a provider server for rejecting the submitted randomly interleaved identifier if the randomly interleaved identifier is substantially identical to a randomly interleaved identifier previously submitted to the provider.

44. Apparatus according to claim 34, wherein the means for randomly interleaving includes means for changing an order of alphanumeric characters in the secret identifier.

45. Apparatus for transacting a charge card transaction, comprising:
 means for receiving from the user a credit card number and a super identifier, the super identifier comprising (i) a secret identifier unique to the user and (ii) a plurality of randomly chosen alphanumeric characters, said super identifier comprising the plurality of randomly chosen alphanumeric characters randomly interleaved, in a one-time true random way, with said secret identifier, wherein said means for receiving is coupled to a computer network;
 means for comparing the received super identifier with a plurality of previously received super identifiers; and
 means for accepting the credit card transaction if the received super identifier is not substantially identical to previously received super identifiers.

46. Apparatus according to claim 45, wherein the secret identifier comprises a PIN.

47. Apparatus according to claim 45, wherein the randomly chosen alphanumeric characters are chosen by the user in a one-time true random way.

48. Apparatus according to claim 45, wherein the number of randomly chosen alphanumeric characters are the same as the number of characters in the secret identifier.

49. Apparatus according to claim 45, wherein said means for receiving are disposed at a point of sale.

50. Apparatus according to claim 45, wherein said means for receiving are disposed at a provider server.

51. Apparatus according to claim 45, wherein said means for receiving are coupled to the Internet.

52. Apparatus according to claim 45, wherein the secret identifier is interleaved by the user using the plurality of alphanumeric characters.

53. Apparatus for carrying out a secure financial transaction, comprising:
 means for receiving from a user (i) a request for a transaction and (ii) a super PIN which comprises a PIN randomly interleaved, in a one-time true random way, with a plurality of alphanumeric characters randomly chosen by a user; and
 means for accepting the request if the received super PIN is substantially dissimilar to a previously received super PIN, wherein the means fore accepting rejects a transaction if the random data in the received data is substantially the same as random data received in a previous transaction corresponding to said user.

54. Apparatus according to claim 53, wherein at least one of the secret identifier and the random data comprises a sequence of alphanumeric symbols.

* * * * *